April 18, 1961 SABURO MUROGA 2,980,893

MEMORY SYSTEM FOR ELECTRIC SIGNAL

Filed Aug. 21, 1956 4 Sheets-Sheet 1

April 18, 1961 SABURO MUROGA 2,980,893

MEMORY SYSTEM FOR ELECTRIC SIGNAL

Filed Aug. 21, 1956 4 Sheets-Sheet 4

2,980,893

MEMORY SYSTEM FOR ELECTRIC SIGNAL

Saburo Muroga, Tokyo, Japan, assignor to Nippon Telegraph and Telephone Public Corporation, Tokyo, Japan, a corporation of Japan Filed Aug. 21, 1956, Ser. No. 605,282

3 Claims. (Cl. 340—174)

This invention relates to magnetic information storage systems and, more particularly, to a memory system for high-speed computers and electronic communication equipment.

In high-speed electronic computers or electric communication equipment which use parametrically excited devices, vacuum tubes or tuning circuits, a memory device is generally used to record signals and preserve them, and later transmit them as needed.

A principal object of this invention is to provide a memory system making use of square-loop magnetic core materials and carrying out a storage function by changing the condition or state of residual magnetization and with a resultant polarity which corresponds to or depends on the phases of the read-in or control signal applied.

Another object of the invention is to provide a memory system using ferro-electric materials exhibiting square-loop hysteresis with the characteristic of residual polarization.

Yet another object of the invention is to provide a simple memory system that is phase-sensitive and can record a signal whose information content is represented by the phase of an alternating current input and can be read out as an output.

Still another object of the invention is to provide a memory system with very little loss and in which the read signal or output is relatively strong.

A feature of the system, according to the invention, is the use of a matrix arranged for a high-capacity of information storage and is applicable to high-speed computers or electrical communication equipment which makes use of alternating inputs or signal current in which binary information or the state or conditions of binary numbers are represented by the phase of a high frequency alternating current controlled as to phase by the phase of a signal input current, and employs parametrically excited resonators such as paramistors or parametrons, which have an output electric current whose two phases vary by 180° in dependence upon the phase of a control signal.

Another feature of the invention is that the memory device will memorize a pulse signal from an electronic computer using vacuum tubes.

Other features, objects and advantages of a system according to the present invention will be better understood from the following description and appended claims read in conjunction with the accompanying drawings in which, Fig. 1 is a schematic diagram, shown partly as a block diagram, of a memory system according to the present invention;

Figure 1:
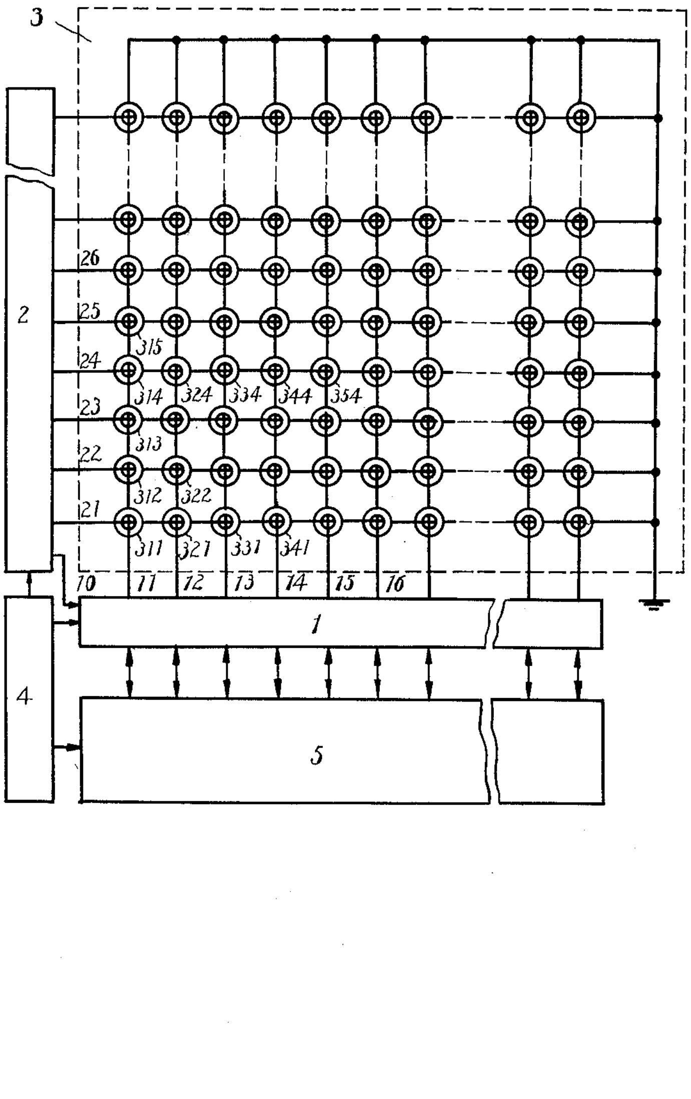

According to Fig. 1 a memory device constructed according to the invention for use in a high-speed computer comprises a large number of read-out and read-in leads 11, 12, 13, each coupled at one end to a register 1 and each having the other end grounded as shown. Read-in leads 21, 22, 23, for selecting an address for setting in or writing in bits, have one end coupled with a selector circuit 2 and the other end thereof is likewise grounded. These wires are crossed in the shape of a lattice-work as shown and at each intersection point are in flux linkage respectively with magnetic cores, 311, 312, 313; 321, 322, 323, 331, 332, and the like, forming a memory matrix 3. The magnetic cores are made of magnetic material having square-loop hysteresis characteristics of a total magnetic field H and magnetic flux density B at each intersection point.

Individual control signals are sent from a control circuit 4, and subsequently signals representative of binary numbers resulting from mathematical operations carried out by means of a computing circuit 5, are applied to the register 1, which applies output currents which correspond to the binary numbers to the leads in each column 11, 12, 13, and the like. The control signals are also applied to the selector circuit 2 which sends the signals for setting in or writing in information through leads 21, 22, 23, and the like, thus the binary digits of each number are recorded on the magnetic cores 314, 324, 334, and the like.

Conversely, the signal written in by such a method is read out to the operation circuit 5 in case a number is required for doing the next mathematical operation. The row required is picked out by sending a selector signal from the control circuit 4 to selector circuit 2 and the recording signal is sent out to the selected lead, as for example, lead 24. The signals corresponding to the number which was recorded on the magnetic cores 314, 324, 334, and the like, are read out on the leads 11, 12, 13, respectively of each column. Thus the numbers recorded on the memory device 3 through the register 1 are sent to the operation or calculating circuit 5.

Figure 2:
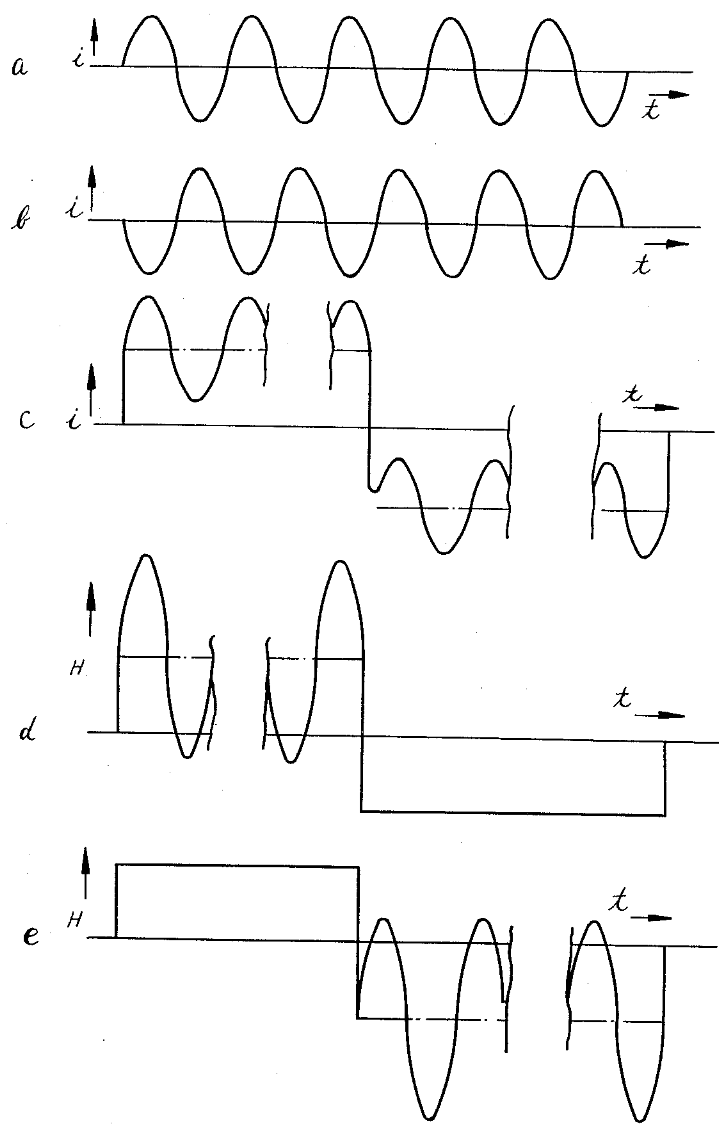
Fig. 2 is a diagram illustrative of the signal current waveforms and the changes of field intensity applicable to a system according to the invention.

For purposes of explanation, it will be assumed that each digit of the binary numbers, such as "0" and "1," is respectively recorded on a corresponding magnetic core of the memory device 3. For example, each figure of the result calculated by means of the circuit 5 is preserved or stored in the register 1 (in certain kinds of computers a section of the circuit 5 is utilized as a register comparable to register 1). The digit or binary condition "0," is represented by an alternating current, for example, a current whose frequency is one megacycle and has a phase equal to 0 radian. This alternating current signal is sent to the lead of the assigned place for this "0" digit and for the figure or binary condition "1," a second alternating current which has a same frequency and a phase corresponding to $\pi$ radians is sent to the lead of the assigned place. If binary numbers to be written in on the group of magnetic cores were, for example, 001011, high frequency currents which have a 0 phase, as shown in Fig. 2(*a*), are applied to the leads 11, 12, 14, and high frequency currents which have an opposite phase corresponding to $\pi$ phase, as shown in Fig. 2(*b*), are sent to the leads 13, 15, 16. And, simultaneously, as mentioned above, by applying a selector signal from the control circuit 4 to the selector circuit 2, signal current for recording the binary digits is made to flow in the selected lead 24 coupled with the magnetic cores, of the row requested, such as 314, 324, 334.

This signal current for recording the numbers is a waveform, Fig. 2(*c*), or alternating current having the same amplitude and frequency as the alternating current that energizes the leads 11, 12, 13, and the like, and is superposed upon a rectangular wave with a lower frequency and the same or almost the same amplitude. However, the superposed alternating current has a 0 radian phase at the positive half-cycle of the rectangular wave and has a $\pi$ radians phase at the negative half-cycle thereof.

Accordingly, for example, the magnetic core 344 is magnetized by electric currents having the waveforms shown in Figs. 2(*a*) and 2(*c*), and the core 354 is magnetized by currents having waveforms illustrated in Figs. 2(*b*) and 2(*c*). A magnetic field is thus induced in the magnetic core 344, as shown in Fig. 2(*d*), whose high frequency components are superposed and in the same phase at the positive half-cycle and are offset from each other on the negative half. The magnetic core 354 has a magnetic field induced therein such as that of Fig. 2(*e*), the high frequency components are offset from each other at the positive part of the rectangular part and superposed on the negative half-cycle.

Figure 3:
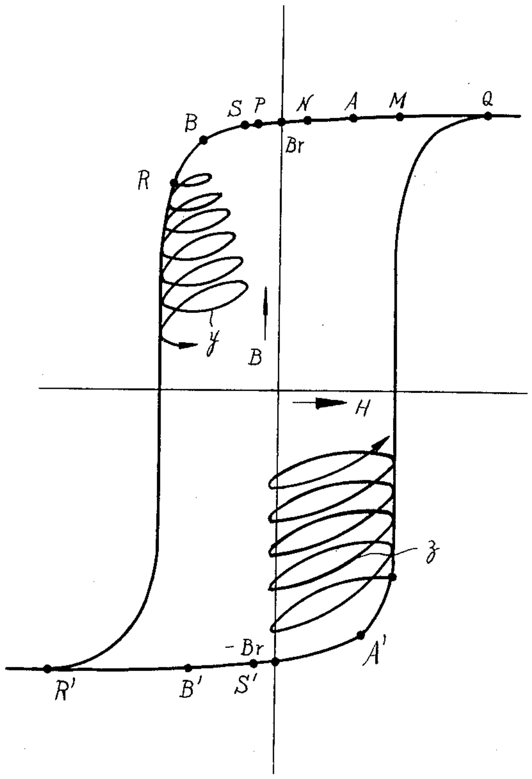
Fig. 3 is a diagram illustrating the characteristic curve or hysteresis loop of the magnetic materials used in this invention.

Assuming that the magnetization characteristic of each magnetic core, that is, the relative relation between the field strength H and magnetic flux density B, has a hysteresis loop or characteristic as shown in Fig. 3, then, if the magnetic core 344 already has a magnetization or permanent induction of +BR, when the rectangular wave is positive, an oscillating field is developed, as the magnetic flux builds up between points P and Q, by the high frequency alternating component with a point A on the curve as a mid-point and on the negative half-cycle of the rectangular wave, or magnetizing force, the magnetic flux neither rises nor falls; it almost stands still at a point B on the loop or curve. Therefore, if the signal currents of the leads 14 and 24 are turned off, the magnetic core maintains a remanance condition of residual magnetism of +BR so that it assumes a condition of magnetization that it had before the magnetizing signals were applied.

Assuming that the magnetic core 344 is in a state of negative magnetization corresponding to a state of remanent induction —B*r*, then upon application of the magnetizing force at the positive half-cycle of the rectangular wave, it assumes an oscillating field condition according to the frequency component with a lower point A′ on the loop as mid-point so that it is driven such that the flux reaches a part of the B–H loop steep side or inclination of the B–H loop and then it rises along the B–H look making an oscillation as shown by a spiral curve *z*, according to a common characteristic of magnetic cores. It finally oscillates between points P and Q with the upper point A as mid-point. Thereafter the core operates as though it were magnetized or driven to a remanence induction +B*r*. Further, as the magnetic field of the magnetic core changes as shown in Fig. 2(*e*), if the signals are off, regardless of the remanent induction of the magnetic core, by means of a completely similar operation, it always holds a remanent induction of —B*r*. That is, the magnetic cores of the row which couple with the lead 24, are recorded with an induction +B*r* in a column where the binary digit to be memorized is "0," and with an induction —B*r* in a column where the digit is "1." Thereby the magnetic cores of this row record binary digits by virtue of application of signal currents from the register 1, each being a high frequency current whose phase corresponds to the binary digit to be recorded. While in this recording operation the other magnetic cores (except 314, 324 . . . ), which were not selected by the selector circuit, have signal current from the register 1 applied thereto, the amplitude of this signal current is so small that the residual magnetism with the same polarity remains even after the removal of this current.

Next, the mechanism to regenerate signals by reading out the binary numbers, for example, 001011 written into memory device 3 by the way mentioned above, will be explained as follows: The signal from the control circuit 4 and the selector circuit 2 selects the row in which digits required to be read out are recorded and then an electric current waveform, indicated in Fig. 2(*c*), flows to the proper lead, as for example, lead 24. Since the magnetic core 344 was magnetized to a state +B*r*, at the positive half-cycle of the rectangular wave, a magnetic field, which oscillates between points M and N with a small amplitude with point A as mid-point is added to it. This part of the loop, however, corresponds to the saturation part of the B–H loop or curve so that output current seldom flows to the lead 14 which is in flux-linkage with the said magnetic core 344. At the negative half-cycle the field oscillates between points R and S with a small amplitude with a mid-point at B. As this part of the loop corresponds to the knee of the B–H loop a considerably large electric current having 0 phase or the opposite phase to that of the high frequency current on the lead 24 is generated in the lead 14. And, since the magnetic core 354 was magnetized to a remanence condition —B*r*, in contrast with this, at the positive half-cycle an electric current of $\pi$ phase is induced in the lead 15. When the magnetic core, with which its lead couples, was magnetized to a magnetization condition +B*r*, a 0 phase high frequency current flows in the lead of the corresponding place of the register 1. Only during the negative half-cycle of the rectangular wave, and when remanence induction —B*r* exists a $\pi$ phase current flows during the positive half-cycle and only during this half-cycle.

Generally speaking, however, the saturation part of the B–H curve or loop, for example, at mid-point A is not completely saturated at the saturation part. For this reason, even though. the magnetic core were magnetized, for example, to a +B*r* state a weak $\pi$ radians phase current, opposite to that of the high frequency current of its input signal, may be induced in the leads connected to the register 1 during the positive half-cycle. And, if a core were magnetized to a —B*r* state a weak 0 phase current during the negative half-cycle is induced in the leads that are connected to the register respectively. Therefore, this induced current may be neutralized by applying high frequency current of a phase of $\pi$ radians and of a little larger amplitude than the induced current from the selector circuit 2 to each place of the register 1 through a lead 10, during the positive half-cycle of the rectangular wave and, by applying a high frequency current which has a 0 phase and is of a little larger amplitude than the induced current, to each place of the register 1 through the lead 10 during the negative half-cycle. Consequently, in the places of the register 1 which correspond to the magnetic cores being magnetized to a +B*r* state the 0 radians phase currents of a minute amplitude flow during the positive half-cycle and those of small amplitude during the negative half-cycle. Therefore, by means of these signal currents for recording and by using parametrons in the register in those places of the register where the corresponding magnetic cores are magnetized to +B*r* state a 0 radians phase high frequency current can be made to oscillate or is induced therein and in places where they are magnetized to a —B*r* state a $\pi$ radians phase high frequency current is induced respectively. These induced currents correspond to the digits recorded so that by sending them to the circuit 5 a next successive mathematical operation can be carried out. And, even if the neutralizing current that flows through the lead 10 is supplied during the recording operation, there arises no inconvenience.

Moreover, during the read-out function mentioned above, for example, in cases where a magnetic core is magnetized to a +B*r* state the magnetic field oscillates between points R and S centering at mid-point B, as shown in Fig. 3, during the negative half-cycle of the rectangular wave.

In this case, however, suppose that point R is on the steep slope of the B–H loop in the same way as the operation mechanism of recording mentioned above, the flux falls making a spiral curve y, along the loop and oscillates between points R′ and S′ finally centering at mid-point B′. And, in this case, while falling along the spiral curve y, a 0 phase alternating current is oscillated in the register by means of a large 0 phase current induced in the lead which couples with the register 1. This oscillation current may be added to the magnetic core again after flowing through the corresponding lead among the lead wires 11, 12, 13, and the like.

Therefore, during the following positive half-cycle of the rectangular wave a high frequency current component oscillates centering at point A superposing on the same phase and rising along the spiral curve z. That is, even though the amplitude of the high frequency current or the rectangular wave current may be so large that, granting that the position of point R, for a while at least, goes over the steep slope of the magnetization curve it resumes its original condition again in the next half-cycle. Consequently the signal being recorded cannot be destroyed by the read-out operation irrespective of whether the magnetic flux falls below the point R or not in read-out operations.

This property of automatic restoration is taken advantage of in following the spiral curve y by sending out a special large signal current from the selector circuit 2 and to induce a large current during this transient period in the lead in each column. And, thus, it is possible to send a strong signal into the register 1. It will be understood that the system of this invention does not utilize high harmonic waves which are generated in the magnetic cores as in other systems which are already known. This system is distinguished by a considerably large output or read out signals. Furthermore, although in Fig. 2(c) the positive half-cycle and the negative half-cycle intervals are directly adjacent it does not absolutely necessarily follow in this way. It is possible for the intervals to be provided for by the insertion of an arbitrary waveform which does not cause a disturbance to the memory device.

Figure 4:
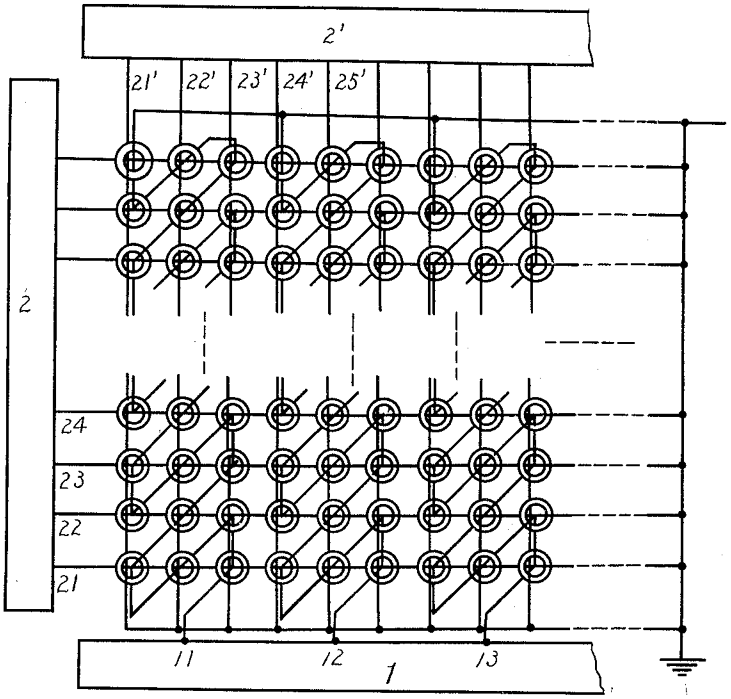
Fig. 4 is a diagram illustrative of another example of a memory system according to the invention.

Fig. 4 is another example of a memory device according to this invention, which is coupled with the register 1. This comprises, for example, a construction in which leads 11, 12, 13, and the like, are coupled to register 1, and is provided with a number of the magnetic cores in each row at points of intersection of leads 21, 22, 23, 24 with selector leads 21′, 22′, 23′ coupled in flux-linkage relationship with each magnetic core and connected to a second selector circuit 2′ separate from the selector circuit 2. The leads 11—13 etc. are intertwined through the cores as shown to sense them and are connected to a common ground with all of the other leads. If an electric current for recording is divided between one of the leads 21, 22 and one of the leads 21′, 22′, 23′, a magnetic field with the same amplitude as the case mentioned above with respect to the other embodiment is generated only at the magnetic core at the point of intersection. Thus, through a third winding coupled with the magnetic cores it is possible to record signals on the magnetic cores and also read them out.

In the said example, in effect, the signal current for recording, shown in Fig. 2(c), from the selector circuit 2 is impressed through the lead in a selected row among the wires 21, 22, etc. which are coupled with the magnetic cores. However, it is entirely possible to split each wire in each row into several leads through each of which a part of the signal current for recording are impressed so that a resultant magnetic field caused by currents in the several wires is the same as before. For example, assume that each wire in each row is split into two, through the one of which only the rectangular wave without superposition of the signal current with a higher frequency flows and through the other of which only the signal current with a higher frequency and with a periodically reversed phase but without the rectangular wave flows. Even in this case we have exactly the same effect for reading and writing in binary digits.

The said example in effect is the case where the condition of the residual magnetism or state of magnetization is changed by the polarity corresponding to the phase of the signal, by using the magnetic cores having square-loop characteristics.

Moreover, dielectric substances having hysteresis, such as barium titanate, are applicable to the invention. To cite an example, a number of strip electrodes equivalent to the leads 11, 12, 13, shown in Fig. 1, can be provided on the surface of a crystal and on the other side of it a number of strip electrodes equivalent to the leads are provided. The former are coupled with the selector circuit 2 and the latter with the register 1 respectively. If the voltage of a waveform, as shown in Fig. 2, corresponding to the signal is impressed on them respectively, it is definitely known that the same operations as those of the example in Fig. 1 can be carried out. That is, it does not necessarily follow that the element on which the signal is to be recorded is confined to magnetic substances, but dielectric substances may also be employed. In short, the system of this invention is applicable in a case where the memory function is carried out by electromagnetic or ferro-electric elements having hysteresis and polarization characteristics corresponding to the directions of the driving or magnetizing signal. And, in this invention, it does not necessarily follow that, as explained with respect to the examples described, that the low frequency rectangular current (or voltage) needs to have an exact rectangular form. A waveform having a gentle slope is also applicable, and in writing in or reading out, it enables the selected magnetic core to record or to read out the signal without exerting any effects upon the magnetic cores of the unselected row. Moreover, in reading the matrix the signal being recorded is a non-destructive signal so that, by using a great number of magnetic cores a considerably large number of signals can be memorized.

This system operates by using signal current in which the information content is indicated by the phase of a high frequency current and is controlled by means of the phase of the signal input current. Therefore, if this system is applied to a high-speed computer or communication equipment using parametrically excited resonators which oscillate so that the output current thereof differs in phase by 180° according to the input signal, such equipment and computers can be greatly simplified as to their construction.

It will be apparent to those skilled in the art that this system can also be applied to an electronic computer using vacuum tubes, in which the existence of a pulse indicates the signal and in which register 1 is provided with means for converting direct current pulses into alternating currents.

What is claimed is:

1. In a memory system of the type having a plurality of toroids coupled and arranged in columns and rows which intersect and in which each of said toroids have a substantially square hysteresis loop and are capable of assuming stable remanence conditions, means to apply to separate rows of toroids separate first alternating current signals representative of binary numbers to be stored in the memory system and having the same frequency and two opposite phases, the first signals consisting of signals having a first phase and other of said first signals having a second phase displaced 180 degrees from the first phase, the first phase signal being representative of the binary digit "0" and the second phase signals being representative of the binary digit "1" means to impress on separate rows of toroids a second alternating current signal, of lower frequency than the first signals, simultaneously with said first signals and in combination with third signals substantially corresponding in phase, amplitude and frequency to the first signals with the first phase signals thereof in correspondence during the positive half cycle of the second signal and the second phase signals thereof in correspondence during the negative half cycle of the second signal thereby to generate a resultant signal on each of selected toroids corresponding to the points of intersection of the columns and rows to which said first, second and third signals are applied, and the resultant signal being representative of the digit to be memorized and stored by a given toroid in a given row and polarizing the given toroid in a direction corresponding to the binary digit to be memorized.

2. In a memory system according to claim 1, including means to read out the signals stored in the toroids and representative of the binary numbers stored therein without disturbing the state of polarization of the toroids.

3. In a memory system of the type having a plurality of toroids coupled and arranged in columns and rows which intersect and in which each of said toroids have a substantially square hysteresis loop and are capable of assuming stable remanence conditions, means to generate first alternating current signals representative of binary numbers to be stored in the memory system, some of said first signals having a given frequency and a phase of 0 radians and representative of the binary digit "0" and other of said first signals having the same frequency and a phase of $\pi$ radians and being representative of the binary digit "1," means to impress each first signal on a separate column of toroids, means to generate a recording second alternating current signal of a substantially rectangular waveform having a frequency lower than said first signals and having superimposed thereon signals corresponding in frequency to the first signal types and having substantially the same amplitude as said first signals with the phase of 0 radian signals superimposed upon its positive half cycle and the $\pi$ radian signals superimposed upon its negative half cycle, selector means for selecting the rows upon which the second signal is to be impressed and for impressing the second signal thereon simultaneously with the application of the first signals thereby to generate a resultant waveform on selected toroids at the point of intersection of the columns and rows to which the first and second signals are applied, and the resultant waveform being representative of the digit to be memorized by a given toroid in a given row and polarizing the given toroid in a direction corresponding to the binary digit to be memorized.

References Cited in the file of this patent

UNITED STATES PATENTS

| | | |
|---|---|---|
| 2,704,842 | Goodell | Mar. 22, 1955 |
| 2,719,965 | Person | Oct. 4, 1955 |
| 2,734,185 | Warren | Feb. 7, 1956 |
| 2,782,397 | Young | Feb. 19, 1957 |
| 2,832,945 | Christensen | Apr. 29, 1958 |
| 2,845,611 | Williams | July 29, 1958 |
| 2,856,596 | Miller | Oct. 14, 1958 |

OTHER REFERENCES

"Ferrites Speed Digital Computers" (Brown), Electronics, April 1953, pp. 146–149.